United States Patent
Saleemi et al.

(10) Patent No.: US 10,134,146 B2
(45) Date of Patent: Nov. 20, 2018

(54) DETECTING, TRACKING AND COUNTING OBJECTS IN VIDEOS

(71) Applicant: RetailNext, Inc., San Jose, CA (US)

(72) Inventors: Imran Saleemi, San Jose, CA (US); Mark Jamtgaard, Mountain View, CA (US); Arun Nair, San Jose, CA (US)

(73) Assignee: RetailNext, Inc., San Jose, CA (US)

( * ) Notice: Subject to any disclaimer, the term of this patent is extended or adjusted under 35 U.S.C. 154(b) by 0 days.

(21) Appl. No.: 15/405,859

(22) Filed: Jan. 13, 2017

(65) Prior Publication Data

US 2017/0206669 A1 Jul. 20, 2017

Related U.S. Application Data (60) Provisional application No. 62/278,559, filed on Jan. 14, 2016.

(51) Int. Cl.
| | |
|---|---|
| *G06K 9/00* | (2006.01) |
| *G06T 7/285* | (2017.01) |
| *G06T 7/292* | (2017.01) |
| *G06T 7/593* | (2017.01) |
| *G06T 7/80* | (2017.01) |

(Continued)

(52) U.S. Cl.
CPC ......... *G06T 7/285* (2017.01); *G06Q 30/0201* (2013.01); *G06T 7/251* (2017.01); *G06T 7/292* (2017.01); *G06T 7/596* (2017.01); *G06T 7/60* (2013.01); *G06T 7/70* (2017.01); *G06T 7/77* (2017.01); *G06T 7/85* (2017.01); *G06T 11/206* (2013.01); *G06T 17/10* (2013.01); *G06T 2200/08* (2013.01); *G06T 2207/10021* (2013.01); *G06T 2207/10024* (2013.01); *G06T 2207/10028* (2013.01); *G06T 2207/20076* (2013.01); *G06T 2207/20081* (2013.01); *G06T 2207/20084* (2013.01);

(Continued)

(58) Field of Classification Search
CPC ......... G06K 9/3241; G06K 2009/3291; G06K 9/00771; G06K 9/209; G06K 9/6201; G06K 9/6255; G06T 2207/10016; G06T 2207/10021; G06T 2207/30242; G06T 7/2093; G06T 7/2086; G06T 7/285; G06T 7/292
See application file for complete search history.

(56) References Cited

U.S. PATENT DOCUMENTS 5,973,732 A * 10/1999 Guthrie .............. G06K 9/00778
348/150
8,391,548 B1 3/2013 Medioni et al.
(Continued)

OTHER PUBLICATIONS

International Search Report and Written Opinion of International Application No. PCT/US2017/13401, dated Apr. 4, 2017, 11 pages.

*Primary Examiner* — Tom Y Lu
(74) *Attorney, Agent, or Firm* — Fish & Richardson P.C.

(57) ABSTRACT

Various embodiments are disclosed for detecting, tracking and counting objects of interest in video. In an embodiment, a method of detecting and tracking objects of interest comprises: obtaining, by a computing device, multiple frames of images from an image capturing device; detecting, by the computing device, objects of interest in each frame; accumulating, by the computing device, multiple frames of object detections; creating, by the computing device, object tracks based on a batch of object detections over multiple frames; and associating, by the computing device, the object tracks over consecutive batches.

29 Claims, 8 Drawing Sheets

(51) Int. Cl.
  *G06T 7/70* (2017.01)
  *G06Q 30/02* (2012.01)
  *G06T 7/60* (2017.01)
  *G06T 11/20* (2006.01)
  *G06T 17/10* (2006.01)
  *G06T 7/77* (2017.01)
  *G06T 7/246* (2017.01)

(52) U.S. Cl.
  CPC ............ *G06T 2207/20221* (2013.01); *G06T 2207/20228* (2013.01); *G06T 2207/30196* (2013.01); *G06T 2207/30232* (2013.01); *G06T 2207/30241* (2013.01); *G06T 2207/30242* (2013.01)

(56) References Cited

U.S. PATENT DOCUMENTS

| | | | |
|---|---|---|---|
| 8,547,437 B2 * | 10/2013 | Buehler | G06K 9/00335 348/143 |
| 9,087,258 B2 * | 7/2015 | Yu | H04N 7/181 |
| 9,124,778 B1 | 9/2015 | Crabtree | |
| 9,183,432 B2 * | 11/2015 | Sasatani | G06K 9/00369 |
| 9,256,945 B2 * | 2/2016 | Pham | G06T 7/0028 |
| 2005/0105765 A1 * | 5/2005 | Han | G06K 9/00295 382/100 |
| 2005/0201612 A1 * | 9/2005 | Park | G06K 9/00778 382/154 |
| 2005/0216274 A1 * | 9/2005 | Kim | G06K 9/00362 704/276 |
| 2009/0252416 A1 | 10/2009 | Komodakis et al. | |
| 2010/0013935 A1 | 1/2010 | Ma et al. | |
| 2011/0129119 A1 * | 6/2011 | Eggert | G06T 7/20 382/103 |
| 2011/0199461 A1 * | 8/2011 | Horio | G06T 7/20 348/46 |
| 2013/0051624 A1 * | 2/2013 | Iwasaki | G06K 9/00791 382/103 |
| 2013/0236058 A1 | 9/2013 | Wang et al. | |
| 2014/0218483 A1 * | 8/2014 | Wang | H04N 13/0239 348/47 |
| 2014/0334670 A1 | 11/2014 | Guigues et al. | |

\* cited by examiner

DETECTING, TRACKING AND COUNTING OBJECTS IN VIDEOS

CROSS REFERENCE TO RELATED APPLICATIONS

This application is a non-provisional application of, and claims priority to, U.S. Provisional Patent Application No. 62/278,559, filed Jan. 14, 2016, the entire contents of which are hereby incorporated by reference.

TECHNICAL FIELD

The subject matter of this disclosure relates generally to detecting, tracking and counting objects of interest in videos.

BACKGROUND

In-store analytics is a collection of systems working together to organize, analyze, and visualize massive amounts of diverse retail data. One important function of these systems is to analyze the number and kinds of shoppers entering a store or passing by a particular location in a store to determine, for example, the potential buying power at that location. Shopper traffic counting also helps identify traffic cycles across the day, week, or year. Store owners can use the shopper traffic accounts to align staff and customer-to-staff ratios to hours with the most shopper visits by integrating workforce management with traffic data. Other advantages of in-store analytics systems include but are not limited to: automatic exclusion of store staff from traffic and isolation of employee paths to complete interaction analysis of sales associates and shoppers, identification of new versus repeat customers and determining visit frequency, duration, pass-by traffic and customer capture rate.

SUMMARY

Various embodiments are disclosed for detecting, tracking and counting objects in video.

In an embodiment, a method of detecting and tracking objects of interest comprises: obtaining, by a computing device, multiple frames of images from an image capturing device; detecting, by the computing device, objects of interest in each frame; accumulating, by the computing device, multiple frames of object detections; creating, by the computing device, object tracks based on a batch of object detections over multiple frames; and associating, by the computing device, the object tracks over consecutive batches.

In an embodiment, a method of detecting and tracking objects of interest comprises: obtaining, by a computing device, multiple frames of stereo image pairs from an image capturing device; rectifying, by the computing device, each frame; computing stereo disparity information for each rectified frame; detecting, by the computing device, objects of interest in each rectified frame using the stereo disparity information; accumulating, by the computing device, multiple frames of object detections; creating, by the computing device, object tracks based on a batch of object detections over multiple frames; and associating, by the computing device, the object tracks over consecutive batches.

Other embodiments are disclosed that are directed to systems and non-transitory, computer-readable storage mediums.

DETAILED DESCRIPTION

Example Retail Analytics Platform

Figure 1:
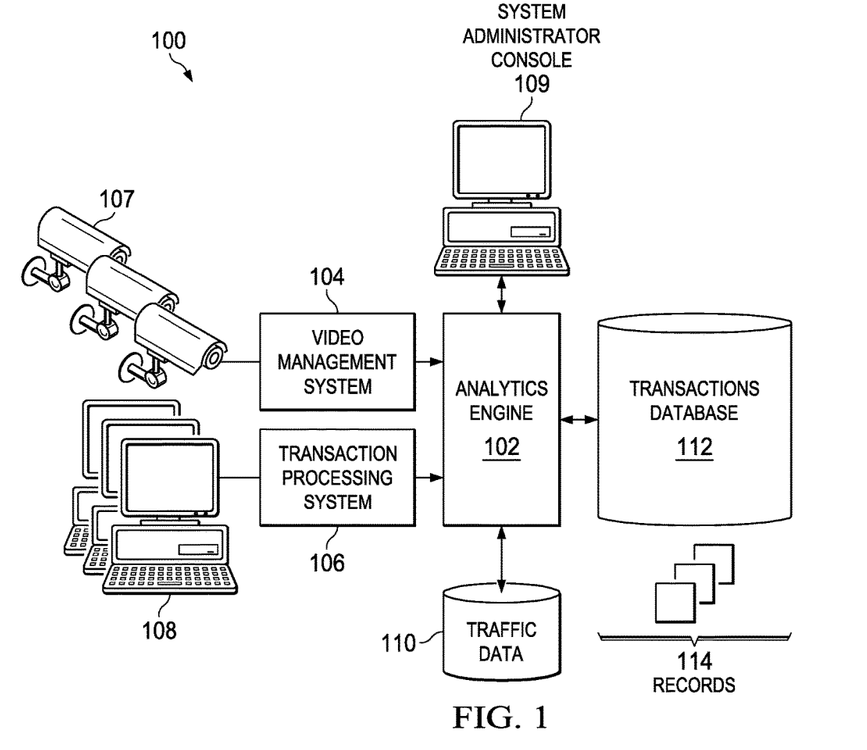
FIG. 1 illustrates an example retail analytics platform, according to an embodiment.

FIG. 1 illustrates an example retail analytics platform, according to an embodiment. System 100 includes analytics engine 102, video management system 104, transaction processing system 106, image capturing device(s) 107, transaction devices(s) 108 and system administrator console 109. Platform 100 can be used in any desired environment to perform data analytics including but not limited to tracking and counting objects of interest captured by image capturing device(s) (107). In the example that follows, platform 100 is deployed in a retail store and is used to track and count shoppers in the retail store so that traffic flow patterns can be discovered and used to improve retail analytics.

Image capturing device(s) 107 can be mounted on walls and/or ceilings at various locations throughout the retail store and directed toward transaction devices(s) 108, ingress and egress points and shopping aisles or any other desired location in the retail store. Capturing device(s) 107 can be monocular intensity cameras, stereo cameras, structured light cameras, time-of-flight (TOF) cameras or any other camera, sensor or system that is capable of capturing grayscale or color intensity images or depth images. As used herein, a depth image is an image that contains information relating to the distance of the surfaces of scene objects from a viewpoint.

Analytics engine 102 can include software, hardware and a combination of software and hardware. Analytics engine 102 takes as input video data from video management system 104, transaction data from transaction management system 106, traffic data from database 110 and transaction history from database 112. Database 110 stores traffic data (e.g., object tracks) associated with shopper traffic derived from videos, as described in further detail below.

Video management system 104 provides a physical interface for capturing device(s) 107. In an embodiment, video management system 104 includes computer hardware and software that implements system 200A for detecting, tracking and counting objects in depth images, as described in reference to FIG. 2A. In another embodiment, video management system 104 includes computer hardware and software that implements system 200B for detecting, tracking and counting objects in grayscale or color images, as described in reference to FIG. 2B.

Transaction processing system 106 provides a physical interface for various transaction devices 108 (e.g., cash registers, computers, scanners) and software for implementing a set of policies, procedures designed to facilitate transactions. Database 112 stores transaction data in transaction records 114. Transaction data can include without limitation, transaction type (e.g., sale, refund, return), amount of transaction, time of transaction and identifiers for the employee who executed the transaction, the store and the transaction computer. The transaction data can also include video data, such as video data capturing a transaction at transaction device(s) 108.

A system administrator can use console 109 to analyze and display data, run search queries and generally facilitate user interaction with analytics engine 102 through a number of graphical user interfaces (GUIs) and input devices. Console 109 can be physically located at the point-of-sale (POS) and/or located remotely and coupled to analytics engine 102 through a network-based connection (e.g., in Internet or Intranet connection). Console 109 can be any device capable of providing a human interface to analytics engine 102, including but not limited to a desktop computer or mobile device (e.g., a tablet computer, smart phone).

Analytics engine 102 calculates statistical parameters (e.g., averages, medians, variances, standard deviations, quantiles) of various business activities (e.g., transactions) to identify patterns in data (e.g., patterns in transactions and video data). Analytics engine 102 can generate employee or customer profiles, perform time-series analysis of time-dependent data, perform clustering and classification to discover patterns and associations among groups of data, apply matching algorithms to detect anomalies in the behavior of transactions. The discovered data patterns and associations can be used for a variety of business purposes, including but not limited to: improving sales, marketing and customer service. In an embodiment, the discovered data patterns and associations can also be used to detect certain types of fraud at the POS, such as fraudulent refund transactions.

Example Object Tracking/Counting System

Figure 2A:
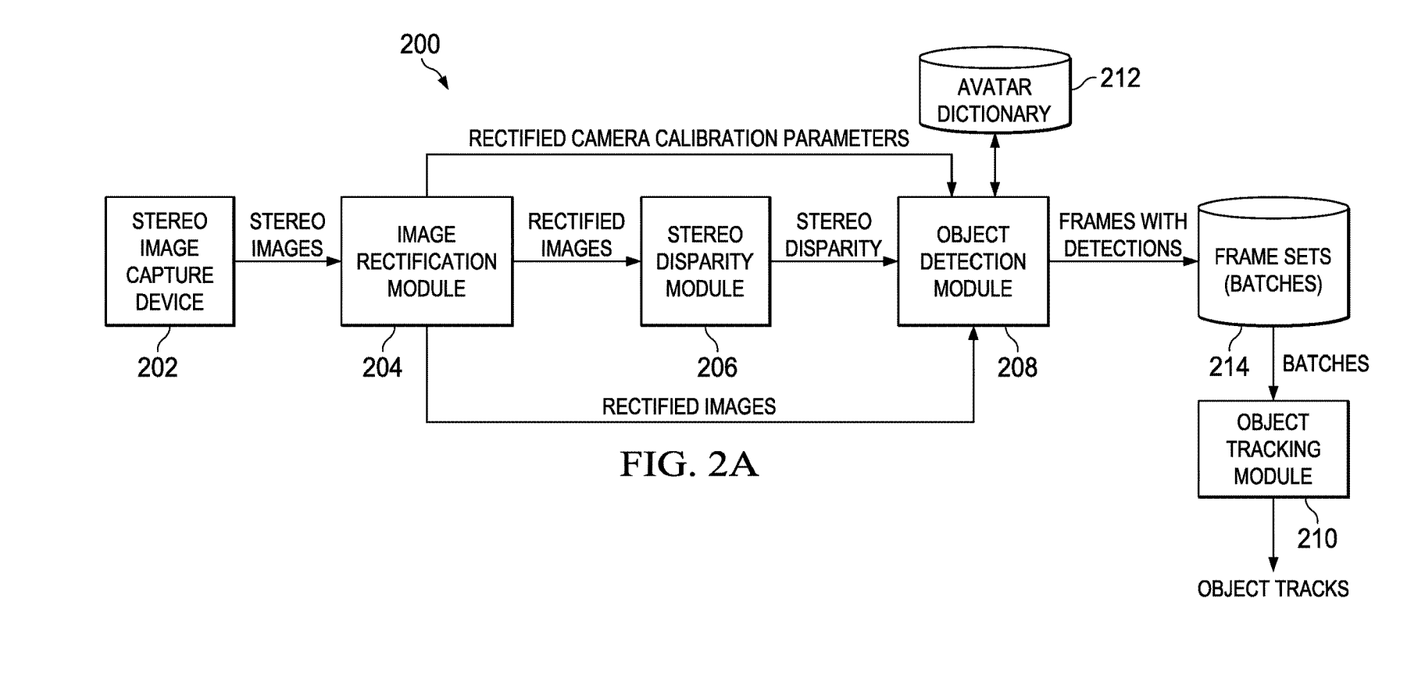
FIG. 2A illustrates an example system for detecting and tracking objects in depth images, according to an embodiment.

FIG. 2A illustrates an example system 200 for detecting and tracking objects of interest in depth images, according to an embodiment. System 200 includes stereo image capturing device(s) 202, image rectification module 204, stereo disparity module 206, object detection module 208, object tracking module 210 and avatar database 212 for storing an avatar dictionary. Although system 200 uses a stereo image camera for capturing depth images, other depth capturing devices can be used, such as structure light and time-of-flight (TOF) cameras. In an embodiment, system 200 can be implemented in video management system 104 described in reference to FIG. 1 and/or analytics engine 102.

Image rectification module 204 rectifies stereo images captured by stereo image capturing device(s) 202 using a projective transformation process that projects the stereo images onto a common image plane to simplify matching points (correspondence) between the stereo images. For example, image rectification module 204 can implement a known image rectification algorithm such as planar rectification, cylindrical rectification or polar rectification. Installation parameters (e.g., installed height and orientation of capturing device(s) 204) and calibration parameters (also called calibration coefficients) describing the alignment of stereo cameras are used to construct the image rectification transform. After rectification epipolar lines of the stereo images are parallel to a horizontal axis of an image coordinate system and corresponding points in the stereo images have identical vertical axis coordinates to facilitate correspondence between the stereo images.

After rectification, stereo (binocular) disparity module 206 scans the left and right images for matching image features. Stereo or binocular disparity refers to the difference in coordinates of similar features within two stereo images due to movement of the image capture device, the elapse of time, and/or movement of objects in the images. In an embodiment, the correspondence between left and right stereo images can be determined by forming a small image patch around every pixel in the left image. The image patches are then compared to all possible disparities in the right image by comparing their corresponding image patches. The comparison between these two patches can be made by obtaining a computational measure that compares each of the pixels in the patches.

The stereo disparity information output by stereo disparity module 206 is used by object detection module 208 to extract depth/distance information from the stereo images. Disparity and distance from the stereo image capture device is inversely related. As the distance from the device increases, the disparity decreases. This inverse relationship allows for depth perception in stereo images. Using geometry and algebra, the points that appear in the 2D stereo images can be mapped as coordinates in a 3D world coordinate system.

Object detection module 208 generates a dictionary of potential 2D projections of a 3D human model mimicking an average human. These projections correspond to an exhaustive set of potential locations in the world coordinate system that a human can occupy, and are realized as a discretized grid with adjacent locations at a pre-specified metric distance. The process of generating the dictionary of projections (hereinafter also referred to as "avatars") may receive as input: (i) specifications of a canonical human model in metric dimensions, and (ii) installation parameters, including ceiling height and two dimensions of rotation relative to the plane of installation that may be computed automatically using a stereo disparity based 3D point cloud and/or orientation sensors on board capturing device 202.

Figure 2B:
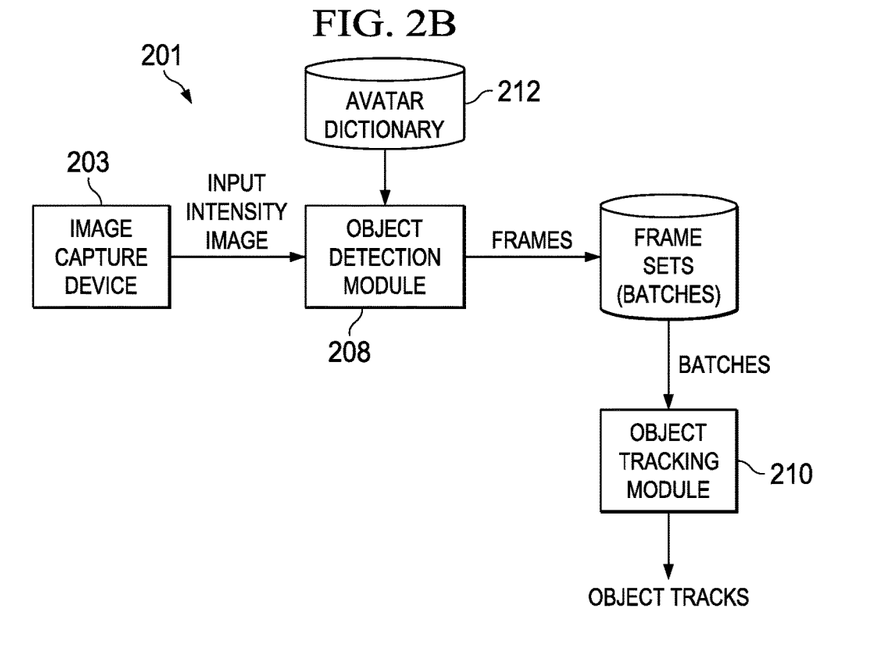
FIG. 2B illustrates an example system for detecting and tracking objects in grayscale or color images, according to an embodiment.

FIG. 2B illustrates an example system 201 for detecting and tracking objects of interest in grayscale or color images, according to an embodiment. System 201 includes image capturing device(s) 203, object detection module 208, object tracking module 210 and avatar database 212 for storing an avatar dictionary.

In case of grayscale or color monocular images, the image rectification and stereo disparity modules 204, 206 shown in FIG. 2A are not required. Instead, object detection module 208 operates directly on the input intensity image using one of several machine learning approaches. In one embodiment, potential objects are detected using a deformable parts model based approach, which has been trained on example instances of the same type of objects of interest, e.g., humans observed from a top down view, etc. An example of this approach is described in Felzenszwalb, Pedro F., Ross B. Girshick, David McAllester, and Deva Ramanan, "Object Detection with Discriminatively Trained Part-based Models." IEEE Transactions on Patter Analysis and Machine Intelligence, Vol. 32, No. 9 (September 2010), pp. 1627-1645, which publication is incorporated by reference herein in its entirety. The output of this first step for each input image is a set of bounding boxes along with scores that describe the confidence of the detector in observing an object of interest within the bounding box. The resulting bounding boxes are then compared against avatars (projections of canonical human models at a specific height and camera pose) to filter out unlikely locations, orientations, and scales.

In one embodiment, the deformable parts based approach is replaced with a deep convolutional neural network that simultaneously regresses to an optimal bounding box location and also classifies the region within the bounding box as one of the desired categories of objects of interest. The output of this process is also a set of bounding boxes each with a corresponding confidence score. An example of this approach is described in Liu Wei, Dragomir Anguelov, Dumitru Erhan, Christian Szegedy, Scott Reed, Cheng-Yang Fu and Alexander C. Berg, "SSD: Single Shot Multibox Detector," European Conference on Computer Vision (ECCV), Springer International Publishing (2016), pp. 21-37, which publication is incorporated by reference herein in its entirety. This step is followed by a comparison against the avatar dictionary to remove false positive detections.

Figure 3:
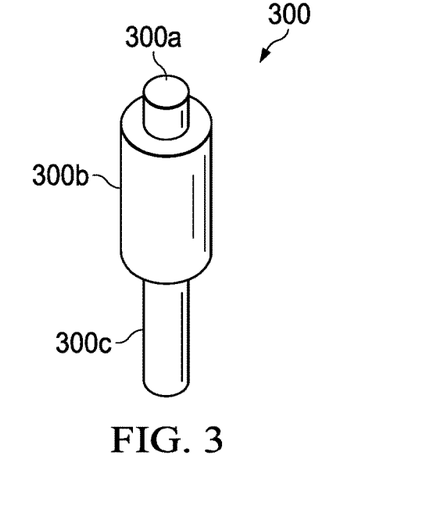
FIG. 3 is an example canonical person model, according to an embodiment.

FIG. 3 illustrates an example avatar comprising a simple canonical person model that includes solid model geometry. In the example shown, three cylinders are combined to create the simple canonical person model. Other models are also possible. A 2D projection is created from the representation of the canonical person model. This representation can be a point cloud, polygons or a parametric representation. Each pixel in the 2D projection represents the depth from stereo image capturing device 202 to a point in the depth image. In case of monocular video analytics, each pixel in the 2D projection is part of a binary representation of the extent and shape of an object at a specific location in 3D coordinates, as observed in the camera image.

Figure 4:
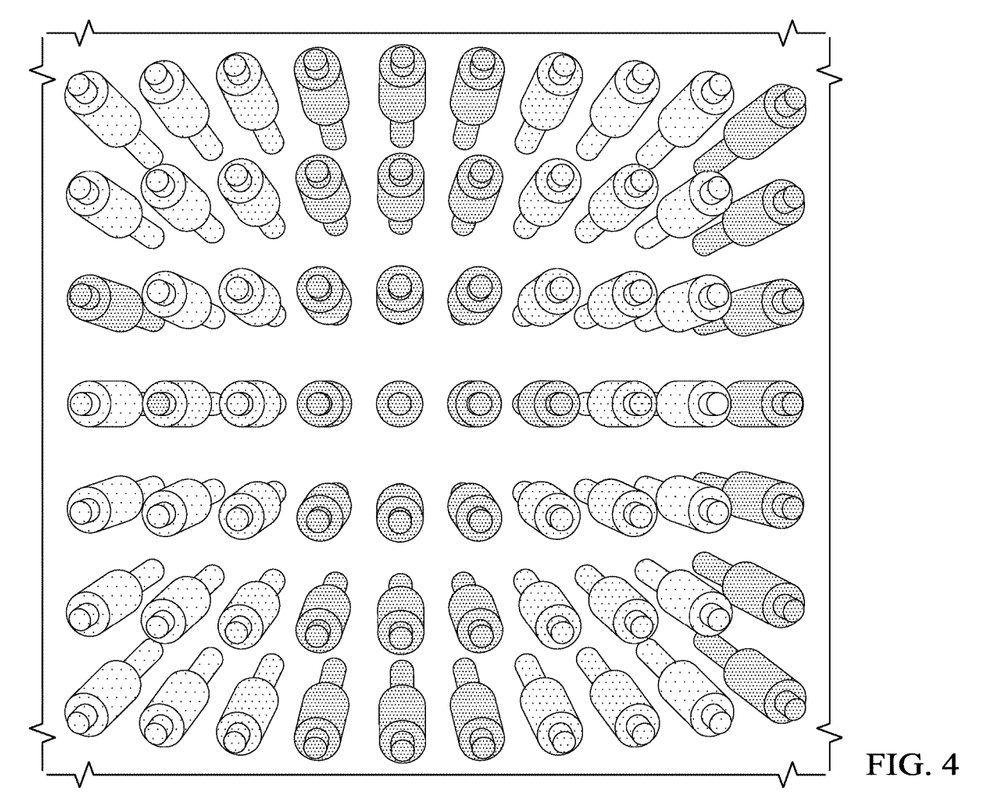
FIG. 4 illustrates a two-dimensional (2D) projection of an avatar dictionary, according to an embodiment.

FIG. 4 illustrates an example of a set of 3D avatar projections in a discretized grid in a rectified image coordinate system. For each frame, as an example, at a rate of 10 frames per second, detection and tracking modules 208, 210 may receive as input: (i) camera calibration parameters including rectified focal length and a baseline; (ii) a dictionary of avatar projections from database 212 for a specific device installation height and rotation; and (iii) stereo disparity information from stereo disparity module 206 for a single frame corresponding to a rectified image.

The process of detection performed by object detection module 208 uses the installation parameters (e.g., device height and rotation) and device calibration parameters to compare an observed disparity to a potential hypothetical disparity given by the dictionary of avatar projections stored in database 212. The comparison can employ the difference in disparity/depth, difference in area (in units of pixels) or shape. The result is a probabilistic map of locations on a ground plane of a world coordinate system that a human may occupy. The location map is further processed to infer final human detections that can be passed on to object tracking module 210. Each of the detected objects may be associated with a 2D location in the rectified image space and 3D location in the world coordinate system in metric coordinates, along with the object's height and a likelihood of observing the object at that location.

In another embodiment, the observed disparity per pixel first votes for proximal avatar locations in the image/world coordinate system, followed by an iterative pixel clustering process that results in a segmentation of the image space into several potential regions. Each of the regions can then be compared with only the closest avatars given by the dictionary. The preprocessing steps allow the generation of a more robust, sparse, and discriminative probabilistic occupancy mask.

Tracking of potential object detections is formulated as the problem of associating object detections over several frames simultaneously. A set of frames is referred to as a "batch." The batches are stored in database or buffer 214. The number of consecutive frames in a single batch can be a configurable quantity and the choice for this number strikes a balance between latency in receiving tracking results versus robustness and reliability in the results. Tracking of objects, specifically humans, in a live video stream can then be decomposed into the problem of tracking within equal or variable length batches, followed by association of the tracks over consecutive batches.

Figure 5A:
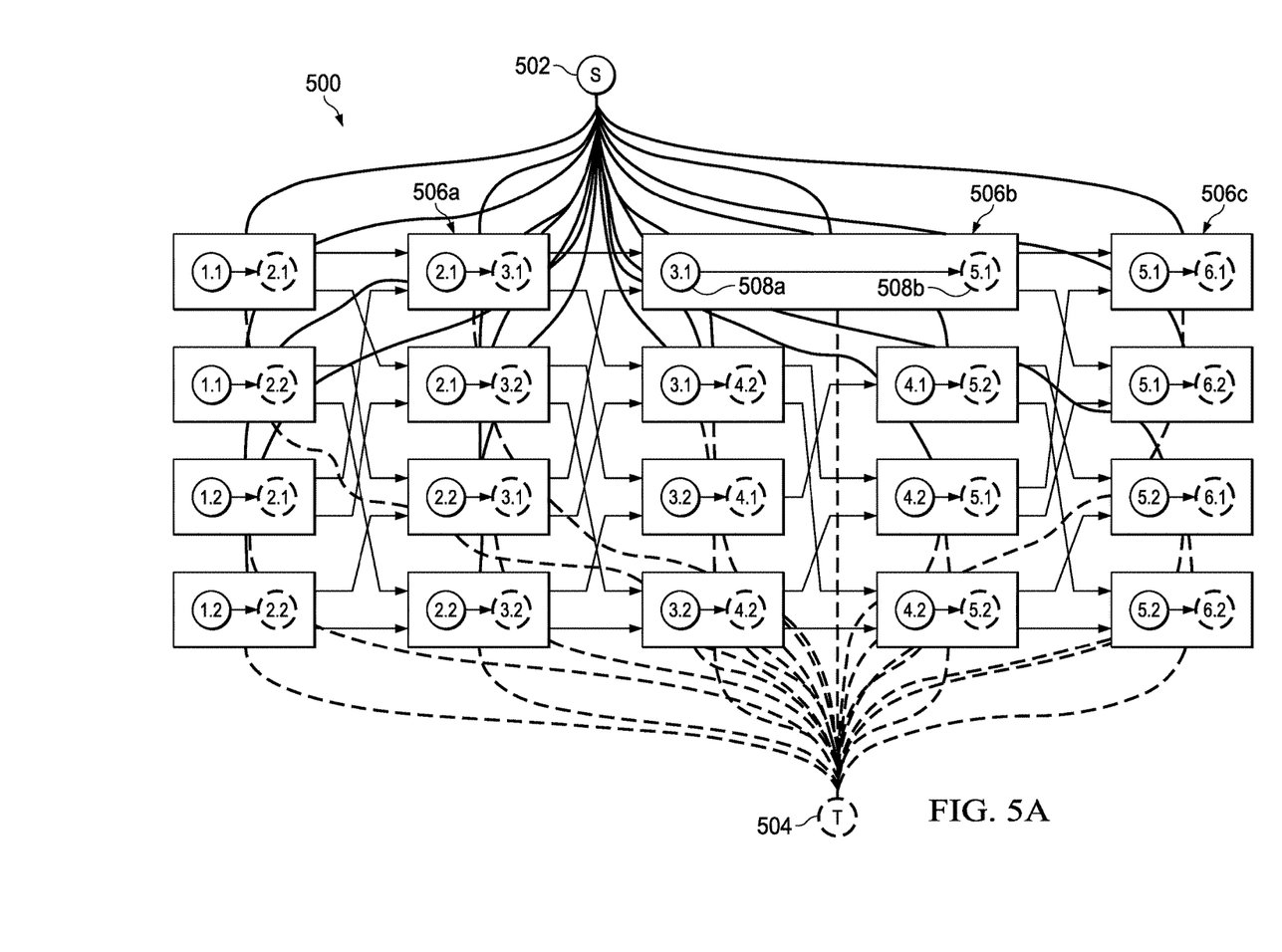
FIG. 5A illustrates a hypothetical hypergraph including edges between vertices and edges to source and sink nodes, according to an embodiment.
Figure 5B:
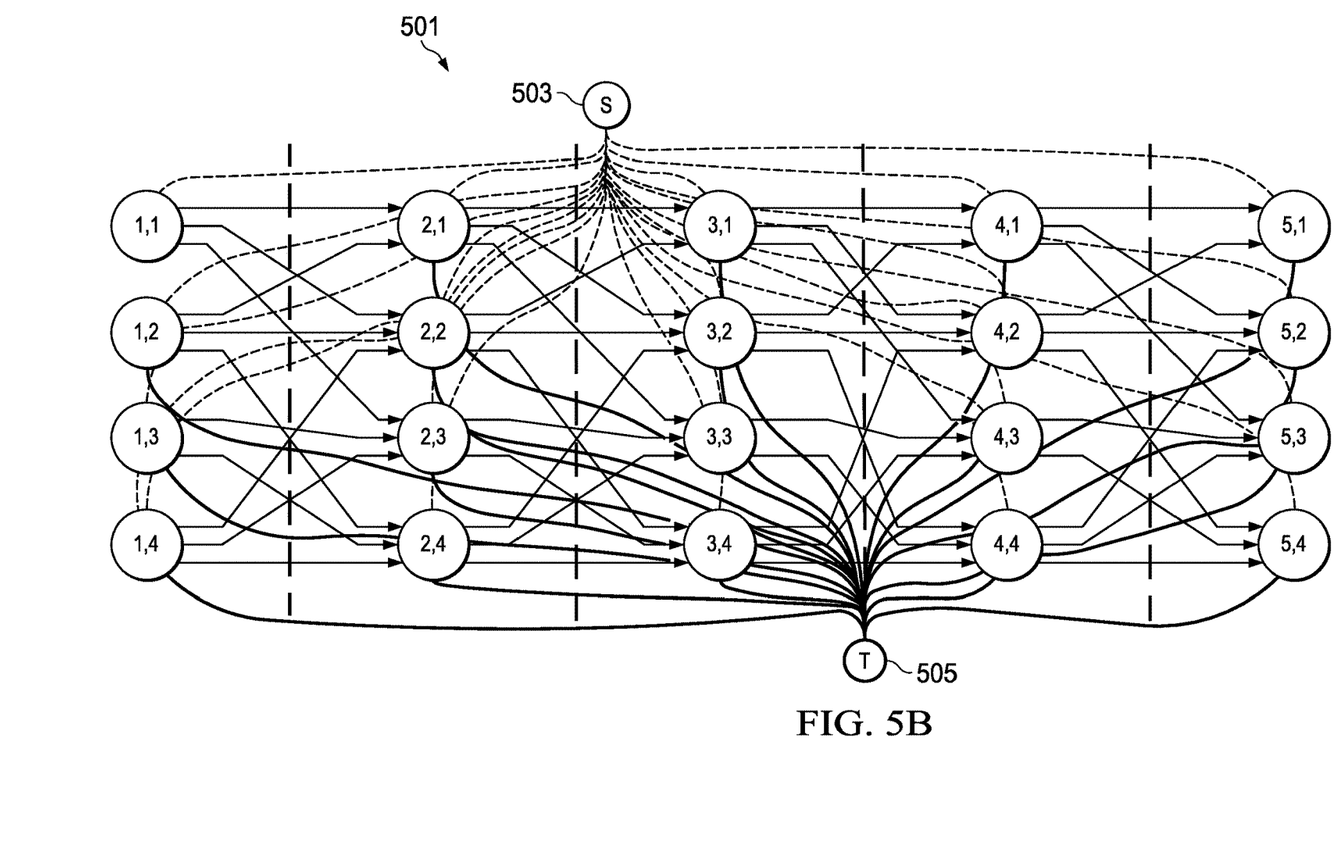
FIG. 5B illustrates an alternative hypothetical graph including edges between vertices and edges to source and sink nodes, according to an embodiment.

In an embodiment, detections from all frames in a single batch are converted by object tracking module 210 into a weighted graph 501 shown in FIG. 5B. Here nodes of the graph are the detections shown as circles, that are numbered as "X.Y" where X is the frame number and Y is the detection number within frame X. The solid arrow represents weighted edges between pairs of nodes carrying the probability of associating the two detections as part of the same track. The decision to add an edge between a pair is based on spatial and temporal proximity between the detections (nodes) being connected. Two special "terminal" nodes called the source 503 (S), and sink 505 (T), nodes are also added to the graph and every other node is connected to these two terminal nodes. These edges, if selected, in a solution, represent the track initialization and termination.

In this embodiment, tracks are estimated as a solution to a network flow optimization problem such that the shortest (least weighted) paths from source to sink nodes are the tracks. Each node is part of exactly one track, including trivial one node tracks representing false positive detections. The solution to the network flow optimization problem is obtained via a dynamic programming approach where at each iteration, a single "best" track is estimated as a path through the graph. During each iteration, the best track up to frame t, is computed as the least weight path from source up to each node in frame t, for all nodes in the batch. The greedy formulation to incrementally build potential tracks, allows online computation of motion dynamics (constant velocity) based edge weights. At the end of each iteration, the path corresponding to the selected track is removed from the graph, and the process is repeated for the next track until the graph is empty or a maximum number of expected tracks is reached. In each iteration, the motion based costs for those edges is recomputed which were shared with nodes eliminated (selected) in immediately previous iteration.

A hypergraph is a generalization of a graph in which an edge can connect any number of nodes. In an embodiment, detections from frames in a single batch are converted by object tracking module 210 into a weighted hypergraph, where hypernodes of the hypergraph depict an association between a pair of detections (nodes) over consecutive or temporally proximal frames, and hyperedges of the hypergraph encode motion dynamics (e.g., constant motion dynamics) over N frames (e.g., three frames), which may be non-consecutive but are close in time. In this embodiment, a "hyperedge" can join at most three nodes, where the three nodes are part of two hypernodes with one node being shared across two hypernodes. The association over non-consecutive frames allows elegant handling of missed object detections (false negative object detections) with the added benefit of hindsight. This formulation also helps avoid excessive object track fragmentation. The weights for the hyperedges are lower for optimal motion dynamics and vice versa. Each hypernode also contains a hypothetical edge that carries a weight that is lower for highly probable detections and vice versa. This edge also encodes similarity of size, height and appearance of objects between associated object detections.

FIG. 5A illustrates an example hypothetical hypergraph 500 including edges between vertices and edges to source 502 (S) and sink 504 (T) nodes, according to an embodiment. Specifically, instances of detections generated by the object detection module 208 are nodes depicted as circles, for example 508a and 508b, that are numbered as "X.Y" where X is the frame number and Y is the detection number within frame X. Pairs of detections in disjoint frames that satisfy a criteria are encapsulated as a "hypernode" depicted as rectangles, for example, 506a, 506b, and 506c in FIG. 5A.

The hypernode generation criteria includes proximity in space and time, as well as first-order similarity heuristics like height, appearance, etc. The solid arrows joining the two detections within a hypernode correspond to an edge that carries a low weight for high probability of matching the two detections, and vice versa. Since the missed detections are not known apriori, detections in non-adjacent frames must also be encapsulated within special hypernodes, called "occlusion hypernodes." An example of such an occlusion hypernode is labeled 506b in FIG. 5A, where detections from frames 3 and 5 are postulated to be a hypothetical correspondence, albeit with a higher than usual edge weight. Each and every hypernode is also connected to the source 502 (S) and sink 504 (T) nodes. The source and sink edges correspond to initialization and termination of object tracks. Potential object tracks are allowed to start and terminate at arbitrary locations in the chosen image/world coordinate system, and the probability of track initialization and termination is controlled explicitly. This probability can be uniform over the tracking area, or can be specified exactly for arbitrary regions or zones within the capturing device's field of view. For example, the probability of track initialization and termination can be higher near the sensor field of view boundaries and lower in the middle.

The hypergraph optimization is framed as the solution to a constrained binary integer linear program with the goal of finding the minimum number of shortest paths (paths with least weight), from the source to sink nodes 502, 504, such that every node is part of some path, and no node is included in more than one path. The paths resulting from this optimization are the object tracks that associate detections across all frames in the batch. The constrained optimization is required because any detection (node) can be part of several hypernodes. Therefore, only one of the multiple hypernodes carrying a specific detection can be selected as the result of an optimization. Furthermore, for every hypernode, at most exactly one incoming and one outgoing hyperedge can be selected including the edges from and to source (S) and sink (T) nodes respectively.

The tracking methods described above are in stark contrast to conventional "online" tracking methods that perform association on a frame-by-frame basis by appending an object detection to an existing track. With the advantage of hindsight in offline tracking using batches of frames, the resulting object tracks are more robust to misdetections, occlusions and false positive object detections.

One example of handling a missed object detection is shown in FIG. 5A, where a detection is missing in frame 4 and a hypernode is created by associating detections (3,1) and (5,1) from non-consecutive frames 3 and 5. Moreover, the proposed optimization is temporally global as compared to locally greedy in conventional frame-by-frame association methods. In other words, batch level simultaneous association is optimal for a set of frames whereas online tracking guarantees optimality only at a single frame level.

The tracking is continued one batch at a time, and the association of tracks over batch boundaries is explicitly handled by allowing a small temporal overlap between adjacent batches. A resulting track describes the position of the object of interest in a world metric coordinate system as well as image pixel coordinate system over the period of time that the object of interest is observable in the field of view of the image capturing device 202, 203. The object tracks may be used for counting the frequency of entrance and exit events when a bounding region is defined, as well as for estimating the duration of persistence of the object of interest within the bounding region. For example, in a retail store a bounding region can be defined at a particular location in the store, such as the front entrance. Object tracks generated by the foregoing embodiments that enter and exit the boundary region can be counted to determine how many customers entered or exited the retail store. In another example, a bounding region can be defined to be around a particular department in the retail store (e.g., electronics section) and the duration of persistence of objects in the bounding region is indicative of the number of customers that visited the electronics section.

Example Process Flows

Figure 6:
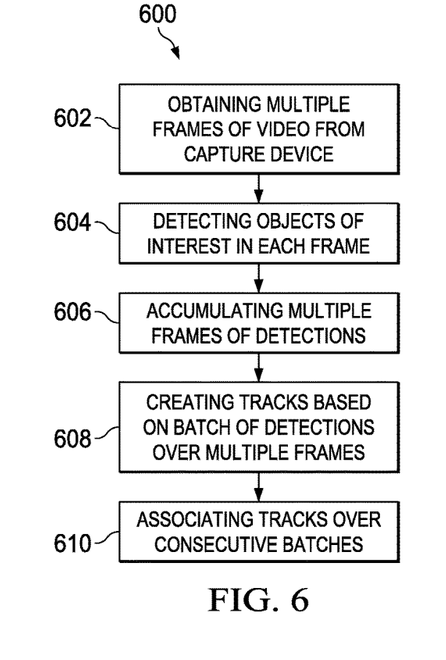
FIG. 6 illustrates an example process of detecting and tracking objects of interest in video, according to an embodiment.

FIG. 6 is a flow diagram of a process 600 for detecting and tracking objects of interest in video, according to an embodiment. Process 600 can be implemented using system architecture 800 described in reference to FIG. 8.

Process 600 can begin by obtaining multiple frames of depth images from an image capture device (602). For example, a structured-light 3D scanner can be used to measure a 3D shape of an object using projected light patterns and a camera system. In another embodiment, a TOF camera can be used to resolve distance based on a known speed of light and measuring the TOF of a light signal between the camera and a subject for each point of the image.

Process 600 continues by detecting objects of interest in each frame (604), accumulating multiple frames of object detections (606), creating tracks based on a batch of object detections over multiple frames (608) and associating tracks over consecutive batches (610). For example, frames with object detections can be stored in a database (e.g., database 214) or buffer and processed in batches by an object tracking module (e.g., object tracking module 210), as described in reference to FIGS. 2 and 5.

Figure 7A:
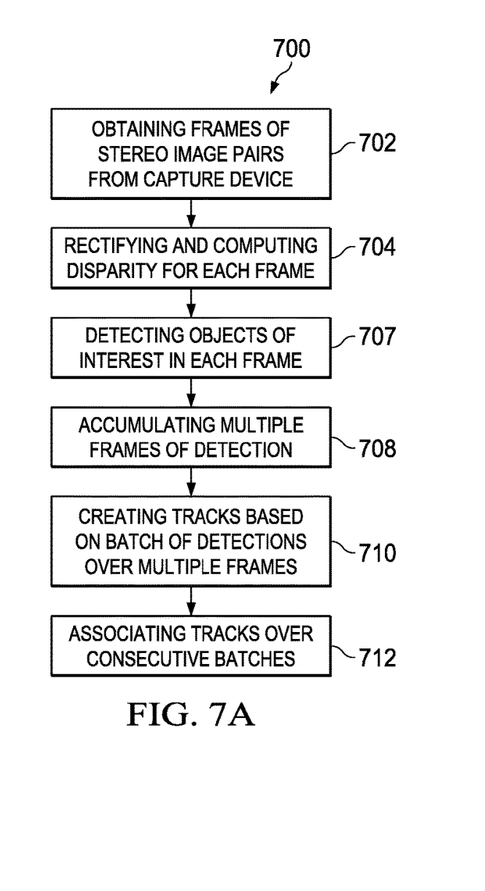
FIG. 7A illustrates an example process of detecting and tracking objects of interest in stereo images, according to an embodiment.

FIG. 7A is a flow diagram of a process 700 of detecting and tracking objects of interest in stereo images, according to an embodiment. Process 700 can be implemented using system architecture 800 described in reference to FIG. 8.

Process 700 can begin by obtaining multiple frames of stereo image pairs from an image capture device (702) and rectifying and computing stereo disparity for each frame (704). For example, the stereo image pair is rectified using a projective transformation process that projects the images onto a common image plane to simplify matching points (correspondence) between the stereo image pair. The rectified images are then processed to determine stereo disparity information. The stereo disparity information provides correspondence between left and right stereo images. The stereo disparity information is used by an object detection module (e.g., objection detection module 208) to extract depth/distance information from the stereo images.

Process 700 then continues in the same manner as process 600 by detecting objects of interest in each frame (706), accumulating multiple frames of detections (708), creating tracks based on a batch of object detections over multiple frames (710) and associating tracks over consecutive batches (712).

Figure 7B:
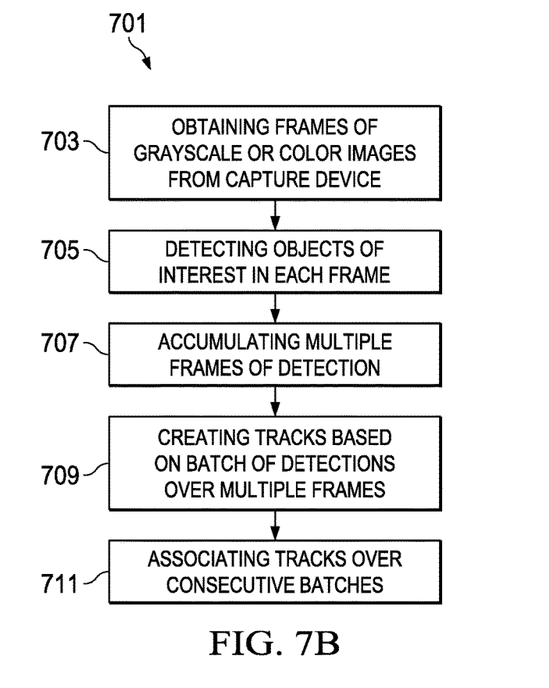
FIG. 7B illustrates an example process of detecting and tracking objects of interest in grayscale or color images, according to an embodiment.

FIG. 7B illustrates an example process 701 of detecting and tracking objects of interest in grayscale or color images, according to an embodiment. Process 701 can be implemented using system architecture 800 described in reference to FIG. 8.

Process 701 can begin by obtaining an input intensity image from an image capture device (703). For example, input intensity images can be obtained from a monocular camera. Process 701 continues by detecting objects of interest in each frame (705). For example, an object detection module (e.g., object detection module 208) operates directly on the input intensity image using one of several machine learning approaches.

In an embodiment, potential objects are detected using a deformable parts model based approach, which has been trained on example instances of the same type of objects of interest, e.g., humans observed from a top down view, etc. The output of this first step for each input image is a set of bounding boxes along with scores that describe the confidence of the detector in observing an object of interest within the bounding box. The resulting bounding boxes are then compared against avatars (projections of canonical human models at a specific height and camera pose) to filter out unlikely locations, orientations, and scale.

In another embodiment, the deformable parts based approach is replaced with a deep convolutional neural network that simultaneously regresses to an optimal bounding box location and also classifies the region within the bounding box as one of the desired categories of objects of interest. The output of this process is also a set of bounding box each with a corresponding confidence score. This step is followed by a comparison against the avatar dictionary to remove false positive detections.

Process 701 can continue by accumulating multiple frames of detections (707), creating tracks based on a batch of object detections over multiple frames (709) and associating tracks over consecutive batches (711).

Example Applications

Object tracks are a foundational element of data acquired using video analytics. For example, foot traffic, e.g., the number of people, shopping carts, and other objects of interest passing by or through a specific area, is generally calculated by counting the number of object tracks that cross an arbitrary line in the scene, or that enter and then exit a bounded shape such as a polygon, or that exit one bounded shape and enter another. Foot traffic is an important metric used by retailers to measure store performance, and calculating accurate foot traffic data is only possible if objects of interest in the scene are detected and tracked with the highest possible accuracy.

Similarly, waiting or dwell time is another important metric used by retailers to measure shopper activity and staff performance, and is generally calculated by measuring the duration that a track spends within a bounded shape, such as a polygon, that is drawn on the scene.

Other applications include heat maps of several object tracks acquired over a period of time that provides a graphical view of aggregate shopper movement within that period, directional statistics that indicate the probability of a shopper moving in a certain direction in the store, etc.

Example System Architecture

Figure 8:
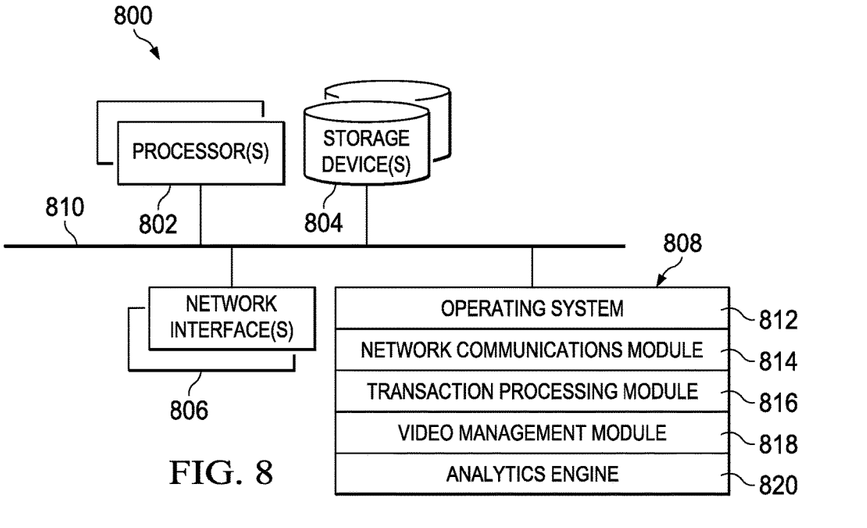
FIG. 8 is a block diagram of a system architecture for implementing the embodiments described in reference to FIGS. 1-7.

FIG. 8 is a block diagram of example server architecture 800 for implementing the features and processes described in reference to FIGS. 1-7, according to an embodiment. Other architectures are possible, including architectures with more or fewer components. In some implementations, architecture 800 includes one or more processor(s) 802 (e.g., dual-core Intel® Xeon® Processors), one or more network interface(s) 806, one or more storage device(s) 804 (e.g., hard disk, optical disk, flash memory) and one or more non-transitory, computer-readable storage medium(s) 808 (e.g., hard disk, optical disk, flash memory, etc.). These components can exchange communications and data over one or more communication channel(s) 810 (e.g., buses), which can utilize various hardware and software for facilitating the transfer of data and control signals between components.

The term "non-transitory, computer-readable storage medium" refers to any medium that participates in providing instructions to processor(s) 802 for execution, including without limitation, non-volatile media (e.g., optical or magnetic disks) and volatile media (e.g., memory).

Non-transitory, computer-readable storage medium(s) 808 can further include operating system 812 (e.g., Mac OS® server, Windows® NT server), network communication module 814, transaction processing module 816, video management system 818 and analytics engine 820. Operating system 812 can be multi-user, multiprocessing, multitasking, multithreading, real time, etc. Operating system 812 performs basic tasks, including but not limited to: recognizing input from and providing output to devices 802, 804, 808 and 808; keeping track and managing files and directories on non-transitory, computer-readable storage medium(s) 808 (e.g., memory or a storage device); controlling peripheral devices; and managing traffic on the one or more communication channel(s) 810. Network communications module 814 includes various components for establishing and maintaining network connections (e.g., software for implementing communication protocols, such as TCP/IP, HTTP, etc.). Transaction processing module 816, video management system 818 and analytics engine 820 are described in reference to FIGS. 1-7.

Architecture 800 can be included in any computer device, including one or more server computers in a local or distributed network each having one or more processing cores. Architecture 800 can be implemented in a parallel processing or peer-to-peer infrastructure or on a single device with one or more processors. Software can include multiple software components or can be a single body of code.

The features described may be implemented in digital electronic circuitry or in computer hardware, firmware, software, or in combinations of them. The features may be implemented in a computer program product tangibly embodied in an information carrier, e.g., in a machinereadable storage device, for execution by a programmable processor; and method steps may be performed by a programmable processor executing a program of instructions to perform functions of the described implementations by operating on input data and generating output.

The described features may be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that may be used, directly or indirectly, in a computer to perform a certain activity or bring about a certain result. A computer program may be written in any form of programming language (e.g., Objective-C, Java), including compiled or interpreted languages, and it may be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors or cores, of any kind of computer. Generally, a processor will receive instructions and data from a read-only memory or a random access memory or both. The essential elements of a computer are a processor for executing instructions and one or more memories for storing instructions and data. Generally, a computer may communicate with mass storage devices for storing data files. These mass storage devices may include magnetic disks, such as internal hard disks and removable disks; magneto-optical disks; and optical disks. Storage devices suitable for tangibly embodying computer program instructions and data include all forms of non-volatile memory, including by way of example, semiconductor memory devices, such as EPROM, EEPROM, and flash memory devices; magnetic disks such as internal hard disks and removable disks; magneto-optical disks; and CD-ROM and DVD-ROM disks. The processor and the memory may be supplemented by, or incorporated in, ASICs (application-specific integrated circuits). To provide for interaction with a user the features may be implemented on a computer having a display device such as a CRT (cathode ray tube), LED (light emitting diode) or LCD (liquid crystal display) display or monitor for displaying information to the author, a keyboard and a pointing device, such as a mouse or a trackball by which the author may provide input to the computer.

One or more features or steps of the disclosed embodiments may be implemented using an Application Programming Interface (API). An API may define on or more parameters that are passed between a calling application and other software code (e.g., an operating system, library routine, function) that provides a service, that provides data, or that performs an operation or a computation. The API may be implemented as one or more calls in program code that send or receive one or more parameters through a parameter list or other structure based on a call convention defined in an API specification document. A parameter may be a constant, a key, a data structure, an object, an object class, a variable, a data type, a pointer, an array, a list, or another call. API calls and parameters may be implemented in any programming language. The programming language may define the vocabulary and calling convention that a programmer will employ to access functions supporting the API. In some implementations, an API call may report to an application the capabilities of a device running the application, such as input capability, output capability, processing capability, power capability, communications capability, etc.

A number of implementations have been described. Nevertheless, it will be understood that various modifications may be made. Elements of one or more implementations may be combined, deleted, modified, or supplemented to form further implementations. In yet another example, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A method of detecting and tracking objects of interest comprising:
    obtaining, by a computing device, a first set of multiple frames of images from an image capture device;
    obtaining, by the computing device, a first set of object detections of moving and non-moving objects of interest in the first set of multiple frames;
    accumulating, by the computing device, the first set of object detections into a first batch of object detections;
    creating, by the computing device, a first set of object tracks based on the first batch of object detections;
    obtaining, by a computing device, a second set of multiple frames of images from the image capture device;
    obtaining, by the computing device, a second set of object detections of moving and non-moving objects of interest in the second set of multiple frames;
    accumulating, by the computing device, the second set of object detections into a second batch of object detections;
    creating, by the computing device, a second set of object tracks based on the second batch of object detections; and
    associating, by the computing device, the first and second sets of object tracks.

2. The method of claim 1, wherein obtaining the first and second sets of object detections further comprises:
    generating, by the computing device, a plurality of two-dimensional projections of three-dimensional models of the objects of interest in an image coordinate system, where each projection corresponds to a set of potential locations in a three-dimensional world coordinate system that the objects of interest can occupy;
    mapping, by the computing device, the set of potential locations to a discrete grid in the image coordinate system with adjacent potential locations being spaced apart by a specified distance;
    generating, by the computing device, a probabilistic map of the set of potential locations on a ground plane of the world coordinate system that the objects of interest can occupy; and
    processing, by the computing device, the probabilistic map of locations to infer object detections.

3. The method of claim 2, wherein the three-dimensional models are canonical object models comprising one or more geometric solids.

4. The method of claim 2, wherein the two-dimensional projections are created from representations of the canonical models, and pixels in the projections represent depths from the image capturing device to points in the images.

5. The method of claim 2, wherein each object detection is associated with a two-dimensional location in the image coordinate system, a three-dimensional location in the world coordinate system, a height of the object and a likelihood of observing the object at the three-dimensional location in the world coordinate system.

6. The method of claim 1, wherein creating the first and second sets of object tracks, further comprises:
converting the first and second batches of object detections into a weighted hypergraph, where vertices of the hypergraph depict an association between a pair of object detections over consecutive or temporally proximal frames and edges connecting the vertices encode motion dynamics of the objects over non-consecutive frames.

7. The method of claim 6, wherein each vertex of the hypergraph contains a hypothetical edge that carries a weight that is selected based on a probability of detection.

8. The method of claim 7, wherein the hypothetical edge encodes similarity of at least one of size, height or appearance between associated object detections.

9. The method of claim 6, wherein the tracks are allowed to start and terminate at arbitrary locations, and the probability of track birth and death is uniform over at least one of a tracking area, region or zone within a field of view of the image capturing device.

10. The method of claim 6, wherein the hypergraph is optimized as a solution to a binary integer linear program that finds a minimum number of paths with least weight from source to sink vertices, such that every vertex is part of the same path, and no vertex is included in more than one path.

11. A method of detecting and tracking objects of interest comprising:
obtaining, by a computing device, a first set of multiple frames of stereo image pairs from an image capture device;
rectifying, by the computing device, each frame in the first set of multiple frames of stereo pairs;
computing, by the computing device, first stereo disparity information for each rectified frame;
obtaining, by the computing device, a first set of object detections of moving and non-moving objects of interest in the first set of multiple frames using the first stereo disparity information;
accumulating, by the computing device, the first set of object detections into a first batch of object detections;
creating, by the computing device, a first set of object tracks based on the first batch of object detections;
obtaining, by the computing device, a second set of multiple frames of images from the image capture device;
obtaining, by the computing device, a second set of multiple frames of stereo pairs from an image capture device;
rectifying, by the computing device, each frame in the second set of multiple frames of stereo image pairs;
computing, by the computing device, second stereo disparity information for each rectified frame;
obtaining, by the computing device, a second set of object detections of moving and non-moving objects of interest in the second set of multiple frames using the second stereo disparity information;
accumulating, by the computing device, the second set of object detections into a second batch of object detections;
creating, by the computing device, a second set of object tracks based on the second batch of object detections; and
associating, by the computing device, the first and second sets of object tracks.

12. The method of claim 11, wherein obtaining the first and second sets of object detections further comprises:
generating, by the computing device, a plurality of two-dimensional projections of three-dimensional models of the objects of interest in an image coordinate system, where each projection corresponds to a set of potential locations in a three-dimensional world coordinate system that the objects of interest can occupy;
mapping, by the computing device, the set of potential locations to a discrete grid in the image coordinate system with adjacent potential locations being spaced apart by a specified distance;
generating, by the computing device, a probabilistic map of potential locations on a ground plane of the world coordinate system that the objects of interest can occupy; and
processing, by the computing device, the probabilistic map of locations to infer object detections.

13. The method of claim 12, wherein the three-dimensional models are canonical object models comprising one or more geometric solids.

14. The method of claim 12, wherein the two-dimensional projections are created from representations of the canonical models, and pixels in the projections represent depths from the image capturing device to points in the images.

15. The method of claim 12, wherein each object detection is associated with a two-dimensional location in the image coordinate system, a three-dimensional location in the world coordinate system, height of the object and a likelihood of observing the object at the three-dimensional location in the world coordinate system.

16. The method of claim 12, wherein creating the first and second sets of object tracks, further comprises:
converting the first and second batches of object detections into a weighted hypergraph, where vertices of the hypergraph depict an association between a pair of object detections over consecutive or temporally proximal frames and edges connecting the vertices encode motion dynamics of the objects over non-consecutive frames.

17. The method of claim 16, wherein each vertex of the hypergraph contains a hypothetical edge that carries a weight that is selected based on a probability of detection.

18. The method of claim 17, wherein the hypothetical edge encodes similarity of at least one of size, height or appearance between associated object detections.

19. The method of claim 16, wherein the object tracks are allowed to start and terminate at arbitrary locations, and the probability of track birth and death is uniform over at least one of a tracking area, region or zone within a field of view of the image capturing device.

20. The method of claim 16, wherein the hypergraph is optimized as a solution to a binary integer linear program that finds a minimum number of paths with least weight from source to sink vertices, such that every vertex is part of the same path, and no vertex is included in more than one path.

21. The method of claim 1, wherein creating object tracks based on a batch of object detections over multiple frames tracking the object detections, further comprises:
converting the batch of object detections into a weighted graph, where vertices of the weighted graph depict object detections, and edges connecting the vertices encode the probability of associating the two detections as part of the same track.

22. The method of claim 21, wherein the edges connecting the vertices are inserted based on spatial and temporal proximity criteria between the vertices being connected.

23. The method of claim 21, wherein the edges encode similarity of motion, and at least one of size, height or appearance between associated object detections.

24. The method of claim 21, wherein the object tracks start and terminate at arbitrary locations, and the probability of track initialization and termination is uniform over at least one of a tracking area, region or zone within a field of view of the image capturing device.

25. The method of claim 21, wherein tracks are estimated as a solution to a network flow optimization problem such that least weighted paths from source to sink nodes are the tracks.

26. A non-transitory, computer-readable storage medium having instructions stored thereon, which, when executed by one or more processors, causes the one or more processors to perform operations comprising:
  obtaining, by a computing device, a first set of multiple frames of images from an image capture device;
  obtaining, by the computing device, a first set of object detections of moving and non-moving objects of interest in the first set of multiple frames;
  accumulating, by the computing device, the first set of object detections into a first batch of object detections;
  creating, by the computing device, a first set of object tracks based on the first batch of object detections;
  obtaining, by a computing device, a second set of multiple frames of images from the image capture device;
  obtaining, by the computing device, a second set of object detections of moving and non-moving objects of interest in the second set of multiple frames;
  accumulating, by the computing device, the second set of object detections into a second batch of object detections;
  creating, by the computing device, a second set of object tracks based on the second batch of object detections; and
  associating, by the computing device, the first and second sets of object tracks.

27. The non-transitory, computer-readable storage medium of claim 26, wherein obtaining the first and second sets of object detections further comprises:
  generating, by the computing device, a plurality of two-dimensional projections of three-dimensional models of the objects of interest in an image coordinate system, where each projection corresponds to a set of potential locations in a three-dimensional world coordinate system that the objects of interest can occupy;
  mapping, by the computing device, the set of potential locations to a discrete grid in the image coordinate system with adjacent potential locations being spaced apart by a specified distance;
  generating, by the computing device, a probabilistic map of the set of potential locations on a ground plane of the world coordinate system that the objects of interest can occupy; and
  processing, by the computing device, the probabilistic map of locations to infer object detections.

28. A non-transitory, computer-readable storage medium having instructions stored thereon, which, when executed by one or more processors, causes the one or more processors to perform operations comprising:
  obtaining, by a computing device, a first set of multiple frames of stereo image pairs from an image capture device;
  rectifying, by the computing device, each frame in the first set of multiple frames of stereo pairs;
  computing, by the computing device, first stereo disparity information for each rectified frame;
  obtaining, by the computing device, a first set of object detections of moving and non-moving objects of interest in the first set of multiple frames using the first stereo disparity information;
  accumulating, by the computing device, the first set of object detections into a first batch of object detections;
  creating, by the computing device, a first set of object tracks based on the first batch of object detections;
  obtaining, by the computing device, a second set of multiple frames of images from the image capture device;
  obtaining, by the computing device, a second set of multiple frames of stereo pairs from an image capture device;
  rectifying, by the computing device, each frame in the second set of multiple frames of stereo image pairs;
  computing, by the computing device, second stereo disparity information for each rectified frame;
  obtaining, by the computing device, a second set of object detections of moving and non-moving objects of interest in the second set of multiple frames using the second stereo disparity information;
  accumulating, by the computing device, the second set of object detections into a second batch of object detections;
  creating, by the computing device, a second set of object tracks based on the second batch of object detections; and
  associating, by the computing device, the first and second sets of object tracks.

29. The non-transitory, computer-readable storage medium of claim 28, wherein obtaining the first and second sets of object detections further comprises:
  generating, by the computing device, a plurality of two-dimensional projections of three-dimensional models of the objects of interest in an image coordinate system, where each projection corresponds to a set of potential locations in a three-dimensional world coordinate system that the objects of interest can occupy;
  mapping, by the computing device, the set of potential locations to a discrete grid in the image coordinate system with adjacent potential locations being spaced apart by a specified distance;
  generating, by the computing device, a probabilistic map of potential locations on a ground plane of the world coordinate system that the objects of interest can occupy; and
  processing, by the computing device, the probabilistic map of locations to infer object detections.

* * * * *